Aug. 26, 1952     C. C. BETTENHAUSEN     2,607,987
DEPTH GAUGE CUTTER KNIFE

Filed Jan. 23, 1950

Inventor
C. C. Bettenhausen
By Arthur H. Sturges

Attorney

Patented Aug. 26, 1952

2,607,987

UNITED STATES PATENT OFFICE 2,607,987

DEPTH GAUGE CUTTER KNIFE

Charles C. Bettenhausen, Lincoln, Nebr.

Application January 23, 1950, Serial No. 140,046

1 Claim. (Cl. 30—320)

This invention relates to knives of the type having a blade retractable into the handle. More particularly, it is an object of this invention to provide a knife as described which is provided with a scale means for determining how far the blade is projecting outwardly of the handle.

Another object of the invention is to provide a knife as described the surface of the handle of which is slanted adjacent the protruding portion of the blade to provide a surface for engaging a piece of material on the outside of the material while the blade is cutting to a desired depth.

Another object is to provide a knife as described having resilient means for causing the retraction of the blade as well as releasable means for maintaining the blade in an extended position.

A particular object resides in the provision of a shaft secured to the blade and in the provision of a spring member for holding said shaft in a stationary position during cutting.

Yet a further object of the invention is to provide a knife as described having a control knob and being so constructed that when the said knob is pushed, the blade automatically will retract.

Yet another object of the invention is to provide a device for the purpose described which is sturdy and durable in construction, reliable and efficient in operation, and relatively simple and inexpensive to manufacture, assemble and utilize.

Other and still further objects and advantages of the invention will become apparent from the following detailed description of a preferred embodiment thereof.

Figure 1:
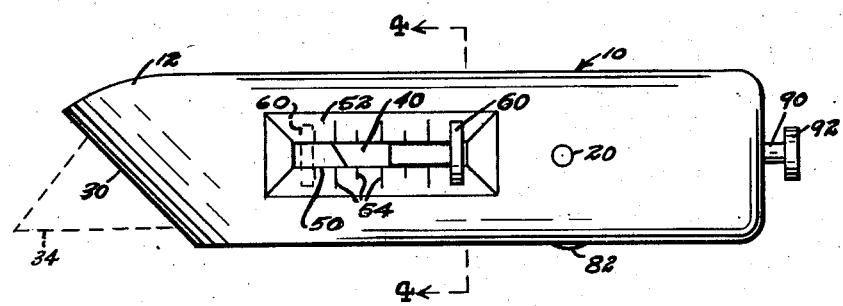
Figure 1 is a top plan view of the knife shown in retracted position, and extended position of the blade being shown in dotted lines together with the position of a blade moving and scale-reading tab.

The knife of this invention includes a handle generally indicated at 10 preferably having two half portions 12 and 14.

The handle 12 is hollow having an open center 16 and having a blade slot 18 disposed through the handle at one end thereof and in communication with the hollow center 16. The two half portions 12 and 14 are secured together by means of a screw 20 and their abutting edges form a line seen at 22.

The handle 10 is of elongated rectangular shape with the exception that that end thereof having the slot 18 therethrough is provided with a slanted or diagonally disposed surface 30 adjacent the slot, which surface connects the edges whereby one edge of the handle is longer than the other, and this surface is adapted to bear against material to be cut for limiting the cutting depth of a blade 34. The blade 34 is slanted on its outer end in a direction opposite the slanted surface 30 and the blade 34 is provided with an elongated beveled cutting edge 36 on that side of the surface 30 which protrudes from the handle the least. The blade 36 is clamped between upper and lower blade holder plates 40 and 42 respectively.

A screw 44 is disposed through the lower plate 42 and is threadedly secured to the upper plate 40. The plates 40 and 42 are adapted to slide in recesses 48. The recesses 48 are disposed in parallelism extending longitudinally of the handle.

The upper handle portion 12 is provided with an elongated opening 50 therethrough as best seen in Figure 1. The upper side walls of the opening 50 are beveled as shown at 52 and are provided with a plurality of markers 54 some of which are of lesser length than others. A tab 60 extends upwardly through the slot 50 having a wide upper end adapted to be gripped by the fingers. The lower end of the tab 60 is disposed at a right angle to the upper end thereof and the said lower end is secured to the upper plate 40.

Figure 3:
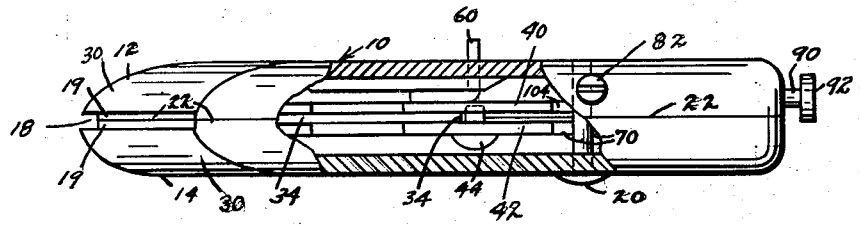
Figure 3 is a view looking at Figure 1 from the bottom as shown, a portion of the cover thereof being removed.
Figure 4:
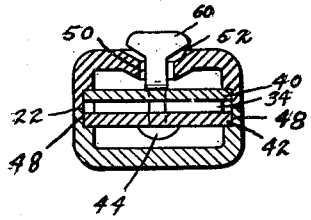
Figure 4 is a view-in-section taken along the line 4—4 of Figure 1.

A shaft 70 extends longitudinally of the handle 10 inside the open center portion 16. The shaft 70 extends outwardly from the lower plate 42, being integral therewith or attached thereto as desired, as best seen in Figure 3.

A resilient or spring member 80 is provided having approximate L shape. An outer leg of the member 80 is secured to a side wall of the handle 10 by means of a screw 82 while the inner end thereof extends transversely to the shaft 70. The transverse portion of the resilient member 80 is normally inclinedly disposed slightly with respect to the shaft 70 and the transverse portion is provided with an aperture 84 disposed about the shaft 70.

Figure 2:
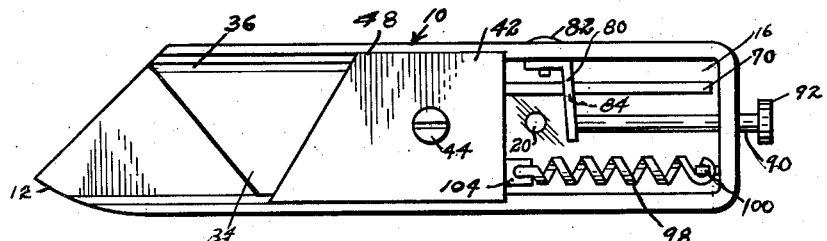
Figure 2 is a bottom plan view of the knife shown with the lower cover portion thereof removed.

The aperture 84 is of such size that its walls grip the shaft 70 when the resilient member is in a relaxed normally inclinedly disposed position as shown in Figure 2. The size of the aperture 84 is slightly larger than the shaft 70, however, whereby when the inner end of the member 80 is forced to a position at a right angle with respect to the shaft 70, the walls of the aperture 84 will release the shaft 70 for slidable movements with respect thereto.

The invention further comprises a plunger 90 having an elongated shank portion slidably disposed through the rearward wall of the handle and secured at its forward end to the innermost end of the resilient member 80. The plunger 90 is provided with a knob or push-button 92 on its outer end whereby when the button 92 is pushed inwardly the resilient member 80 will release the shaft 70.

A coil tension spring 98 is secured to the rearward wall of the handle by means of a suitable hook 100 and is secured to the upper plate 40 by means of an apertured tab 104.

As thus described it will be seen that the spring 98 will urge the knife blade 34 toward a retracted position. The resilient member 80 will normally prevent the blade 34 from retraction. Upon release of the member 80 by means of the plunger 90 the blade will be free to retract.

In operation, and prior to cutting, the plunger 90 is pushed inwardly and the tab 60 is moved forward adjacent a desired one of the markers 54 for setting the distance the knife blade 34 protrudes outwardly past the surface 30. Cutting can then be done without danger of the knife sinking an excessive distance into the material.

From the foregoing description, it is thought to be obvious that a depth gauge cutter knife constructed in accordance with my invention is particularly well adapted for use, by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice, except as claimed.

I claim:

In a depth gauge knife, the combination which comprises an elongated rectangular-shaped handle having long edges connected by short ends and with one of said ends diagonally positioned whereby one edge is longer than the other, said diagonally positioned end having a blade receiving slot therein and the said edges of the handle having longitudinally positioned recesses in the inner surfaces, spaced parallel blade holding plates positioned in the handle and slidably mounted in the said recesses, a cutting blade positioned between the plates and having a sharp cutting end extended from the plates and positioned to extend through the said blade receiving slot in the diagonally positioned end of the handle, means clamping the blade between the said plates, said handle having an elongated opening with scale marks at the edges in one side thereof, a tab carried by one of said plates and extended through the elongated opening in the handle for adjusting the position of the cutting blade whereby with the cutting end of the blade extended beyond the surface of the diagonally positioned end of the handle and with the said surface of the diagonally positioned end held against the material being cut the end of the blade extends into the material, a shaft positioned in the handle and extended from one of said parallel plates, a spring gripping member extended from one edge of the handle and having an opening therein through which the said shaft extends, a plunger extended from said spring gripping member through the handle for actuating the gripping member to release the shaft, and a spring positioned in the handle with one end attached to the end of the handle and the other to one of the said blade holding plates for urging the said plates to draw the cutting blade into the handle.

CHARLES C. BETTENHAUSEN.

REFERENCES CITED

The following references are of record in the file of this patent:

UNITED STATES PATENTS

| Number | Name | Date |
|---|---|---|
| 137,745 | Whitney | Apr. 8, 1873 |
| 1,406,156 | Cotter et al. | Feb. 7, 1922 |
| 1,701,771 | Di Stefano | Feb. 12, 1929 |
| 1,906,573 | Gits | May 2, 1933 |
| 2,215,216 | Gits et al. | Sept. 17, 1940 |
| 2,243,030 | Fischer | May 20, 1941 |